United States Patent [19]

Iso

[11] Patent Number: 5,768,739
[45] Date of Patent: Jun. 23, 1998

[54] CONNECTOR MEMBER OF WINDSHIELD WIPER

[75] Inventor: Tomonori Iso, Kazo, Japan

[73] Assignee: Nippon Wiperblade Co., Ltd., Saitama-ken, Japan

[21] Appl. No.: 870,556

[22] Filed: Jun. 6, 1997

Related U.S. Application Data

[63] Continuation of Ser. No. 651,674, May 21, 1996, abandoned.

[30] Foreign Application Priority Data

May 22, 1995 [JP] Japan .................................. 7-156598

[51] Int. Cl.$^6$ ........................................................ B60S 1/40
[52] U.S. Cl. ........................................ 15/250.32; 403/329
[58] Field of Search ........................... 15/250.32, 250.31, 15/250.44, 250.46, 250.33; 403/329, 326, 327, 263, 154, 155, 161, 24

[56] References Cited

U.S. PATENT DOCUMENTS 4,327,458  5/1982  Maiocco ............................... 15/250.32
5,168,597  12/1992  Schon et al. ........................... 15/250.32
5,332,328  7/1994  Yang ..................................... 15/250.32

FOREIGN PATENT DOCUMENTS 2756476  6/1979  Germany .............................. 15/250.32
2019203  10/1979  United Kingdom ................ 15/250.32
2163043  2/1986  United Kingdom ................ 15/250.32

Primary Examiner—Gary K. Graham

[57]  ABSTRACT

A connector member which connects a primary lever of a wiperblade having spaced parallel side walls at lengthwise central portion of the primary lever and a pivot pin extending between the side walls with a U-shaped tip end of a wiperarm, in which the connector member comprises spaced parallel side walls for slidably engaging with the side walls of the primary lever, a body portion integrally connecting the side walls, a transverse opening formed in the body portion for pivotally receiving the pivot pin, and a through opening formed in the body portion and extending vertically at the location rearward of the pivot pin or in the direction toward the base end of the wiperarm.

2 Claims, 2 Drawing Sheets

5,768,739

CONNECTOR MEMBER OF WINDSHIELD WIPER

This application is a continuation, of application Ser. No. 08/651,674 filed on May 21 1996, now abandoned.

BACKGROUND OF THE INVENTION

This invention relates to a windshield wiper and, particularly, to a connector member of a windshield wiper which connects a wiperarm with a wiperblade, and which windshield wiper is adapted for use in a vehicle such as an automobile and the like.

A typical prior art windshield wiper comprises a wiper motor mounted on a body of a vehicle such as an automobile and driving a reciprocatingly rotatable wiper shaft, an arm head of a wiperarm secured to the wiper shaft, a wiperblade reciprocatingly driven by the wiper shaft and having an elongated blade rubber for contacting with the surface of a windshield, and a connecting member for connecting the wiperblade with the wiperarm Various types of the wiperarm have been proposed and utilized practically and, but the present invention relates particularly to the type in which the tip end of the wiperarm has a U-shaped configuration.

Usually, the U-shaped tip end of the wiperarm is connected to a lengthwise central portion of a primary lever of the wiperblade through a connector member. The primary lever has spaced parallel side walls at the lengthwise central portion thereof, and the connector member is located between the side walls and is supported pivotally by a pin which extends between the side walls.

Typically, the prior art connector member has spaced parallel side walls with the outer surfaces thereof being adapted to slidably engage with the spaced parallel side walls of the primary lever and the inner surfaces thereof being adapted to locate transversely the U-shaped tip end of the wiperarm, a body portion extending between the inner surfaces of the side walls and being adapted to fit with the inner surfaces of the U-shaped tip end of the wiperarm, an opening formed in the body portion for slidably engaging with the pin which extends between the side walls of the primary lever, a projecting portion formed on the body portion for engaging resiliently with an opening formed in the U-shaped tip end of the wiperarm, and a lever portion for permitting the disengagement between the connector member and the wiperarm.

In the typical prior art connector member, there is a problem that the configuration of the connector member is complicated and that cost of the mold for producing the connector member is expensive.

Further, when the contacting area between the connector member and the wiperarm is small, there is a tendency that the movement of the wiperblade is not smooth and that undesirable vibrations may be observed Accordingly, it is required to overcome the above described problems.

The present invention aims to provide a novel connector member of a windshield wiper.

SUMMARY OF THE INVENTION

According to the present invention, there is provided a connector member which connects a primary lever of a wiperblade having spaced parallel side walls at lengthwise central portion of the primary lever and a pivot pin extending between the side walls with a U-shaped tip end of a wiperarm, in which the connector member comprises spaced parallel side walls for slidably engaging with the side walls of the primary lever, a body portion integrally connecting the side walls, a transverse opening formed in the body portion for pivotally receiving the pivot pin, and a through opening formed in the body portion and extending vertically at the location rearward of the pivot pin or in the direction toward the base end of the wiperarm According to the invention, it is possible to reduce largely the cost of the mold for making the connector member, since the construction of the mold can be simplified largely.

DESCRIPTION OF THE DRAWINGS

The features of the present invention that are believed novel are set forth in the appended claims. The invention, togetherwith further objects and advantages thereof, may best be understood from the following description taken in conjunction with the accompanying drawings, in which.

DETAILED DESCRIPTION OF PREFERRED EMBODIMENTS

Figure 5:
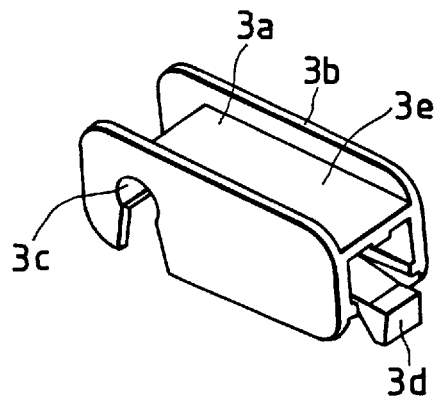
FIG. 5 is a perspective view showing a typical prior art connector member.
Figure 6:
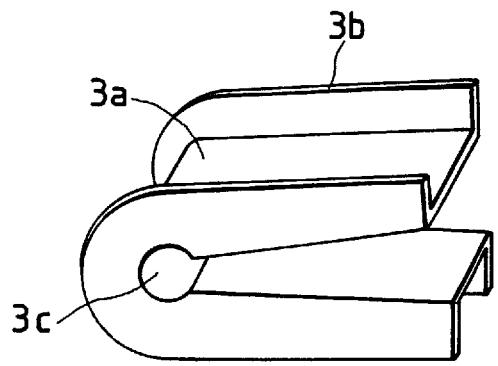
FIG. 6 is a perspective view showing another prior art connector member.
Figure 7:
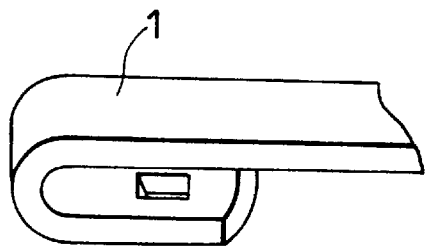
FIG. 7 is a perspective view showing the tip end of a prior art wiperarm.

FIGS. 5 and 6 show some examples of prior art connector members which are adapted to connect a U-shaped tip end of a wiperarm as shown in FIG. 7 with a primary lever of a wiperblade.

In FIG. 5, the connector member has spaced parallel side walls 3b with the outer surfaces thereof being adapted to slidably engage with spaced parallel side walls of a primary lever and the inner surfaces thereof being adapted to locate transversely the U-shaped tip end of a wiperarm 1 as shown in FIG. 7, a body portion 3a extending between the inner surfaces of the side walls and being adapted to fit with the inner surfaces of the U-shaped tip end of the wiperarm 1, an opening 3c formed in the body portion for slidably engaging with the pin which extends between the side walls of the primary lever, a projecting portion 3d formed on the body portion 3a for engaging resiliently with an opening (as shown in FIG. 7) formed in the U-shaped tip end of the wiperarm 1. The projecting portion 3d is resiliently urged downward in FIG. 5 and permits the disengagement between the connector member and the wiperarm 1 when the portion 3d is pushed upward in FIG. 5.

FIG. 6 shows another prior art connector member. The construction is simple, and the cost for producing the connector member is cheap, but it is difficult to reduce the play between the connector member and the wiperarm, and to reduce the play between the connector member and the primary lever in the lateral directions (between the side walls of the connector member and the side walls of the connect or member) and in the radial direction (between the pivot pin of the primary lever and the opening 3c of the connector member). Such undesirable play induces the noise in operating the wiper and induces unsatisfactory wiping operations.

Figure 1:
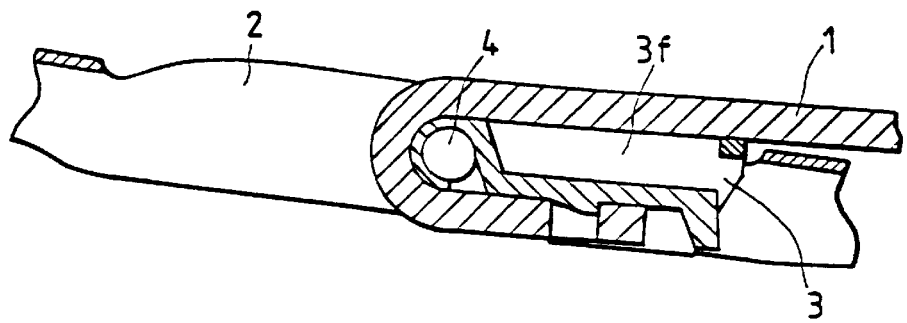
FIG. 1 is a sectional view showing a connecting portion between the tip end of a wiper arm and a primary lever of a wiperblade through a connector member according to a preferred embodiment of the present invention.

In FIG. 1, a U-shaped tip end of a wiperarm 1 is connected to a primary lever 2 of a wiperblade through a connector member 3 according to a preferred embodiment of the present invention. The connector member 3 is pivotally connected to the primary lever 2 through a pivot pin 4 which extends between spaced parallel side walls (only one of them is shown in FIG. 1) of the primary lever 2 and is secured to one of them.

Figure 3:
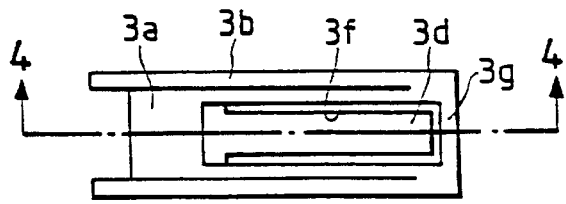
FIG. 3 is a plan view of the connector member of FIG. 1.
Figure 4:
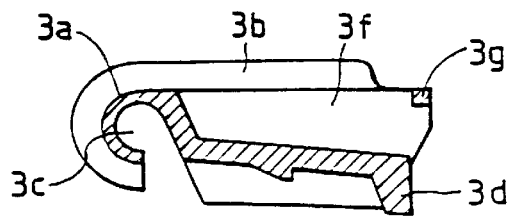
FIG. 4 is a sectional view taken along line 4—4 shown in FIG. 3.

The connector member 3 is formed integrally of a synthetic resin material, and is fitted rotatably on the pivot pin 4. The connector member 3 comprises spaced parallel side walls 3b for slidably engaging with the side walls of the primary lever 2, a body portion 3a integrally connecting the side walls 3b, a transverse opening 3c formed in the body portion 3a for pivotally receiving the pivot pin 4, and a through opening 3f formed in the body portion 3a and extending vertically at the location rearward of the pivot pin 4 or in the direction toward the base end of the wiperarm 1. A resilient lever portion 3d is formed on the body portion 3a integrally and having thereon a projecting portion for engaging with an opening in the tip end of the wiperarm 1. The lever portion 3d is located in the range of the through opening 3f as viewed vertically (FIG. 3), which enables to simplifying the design of the mold.

Figure 2:
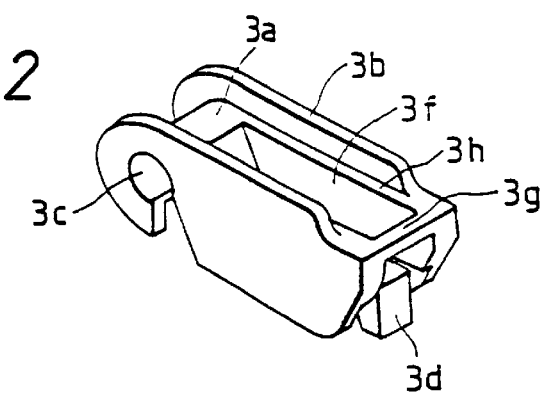
FIG. 2 is a perspective view of the connector member of FIG. 1.

As shown in FIGS. 1 and 2, the upper surfaces of shoulder portions 3h and body portions 3a and 3g form a continuous ledge which bounds through opening 3f and contacts the inner surface of the wiperarm 1, thereby reducing undesirable play between the wiperarm 1 and the connector member 3 in the connected condition.

According to the invention, it is simple in the construction, it is reliable in maintaining the assembled condition between the wiperarm and the primary lever of the wiperblade, it is possible to reduce substantially the cost of the mold for producing the connector member, and it is easy to disassemble from the assembled condition.

It will be understood that the invention is not limited to the embodiment, and various changes or modifications can easily be applied by those skilled in the art within the spirits of the present invention.

What is claimed is:

1. A connector member for coupling a U-shaped end of a wiper arm to a wiper blade having a pivot pin extending between spaced parallel sidewalls of the wiper blade, the connector member comprising:

laterally spaced parallel connector sidewalls for slidably engaging with the sidewalls of the wiper blade;

a first body portion integrally joining first ends of the connector sidewalls, the first body portion including a first opening for receiving the pivot pin;

a second body portion integrally joining second ends of the connector sidewalls which are longitudinally displaced from the first ends;

shoulder portions projecting laterally inwardly from the connector sidewalls and forming, with upper surfaces of the first and second body portions, a continuous ledge which provides support for the wiper arm adjacent the U-shaped end thereof, the ledge bounding a second opening extending through the connector member between upper and lower edges of the connector sidewalls; and a lever (1) formed integrally with the first body portion and (2) extending longitudinally within the second opening toward the second ends of the connector sidewalls, the lever being wholly contained within the second opening and including a downwardly projecting portion for engaging in an opening in the U-shaped end of the wiper arm.

2. The connector member as recited in claim 1, wherein the connector member is formed of a synthetic resin material by a molding process.

* * * * *